(No Model.)

W. C. HOOKER.
ANIMAL TRAP.

No. 528,671. Patented Nov. 6, 1894.

Inventor
William C. Hooker,

By his Attorneys.
C. A. Snow & Co.

Witnesses
B. S. Ober
J. F. Riley

UNITED STATES PATENT OFFICE.

WILLIAM C. HOOKER, OF ABINGDON, ILLINOIS.

ANIMAL-TRAP.

SPECIFICATION forming part of Letters Patent No. 528,671, dated November 6, 1894.

Application filed March 14, 1894. Serial No. 503,629. (No model.)

*To all whom it may concern:*

Be it known, that I, WILLIAM C. HOOKER, a citizen of the United States, residing at Abingdon, in the county of Knox and State of Illinois, have invented a new and useful Animal Trap, of which the following is a specification.

The invention relates to improvements in animal traps.

The object of the present invention is to provide, for catching mice and rats, a simple, inexpensive and efficient trap adapted not to excite the suspicion of an animal, and capable of being arranged close to a rat-hole, and of being sprung by the animal passing over it when not attracted by the bait.

A further object of the invention is to provide a sensitive trap which may be readily set, and which will be instantly sprung at the slightest attempt of an animal to obtain the bait.

The invention consists in the construction and novel combination and arrangement of parts hereinafter more fully described, illustrated in the accompanying drawings, and pointed out in the claims hereto appended.

Figure 1:
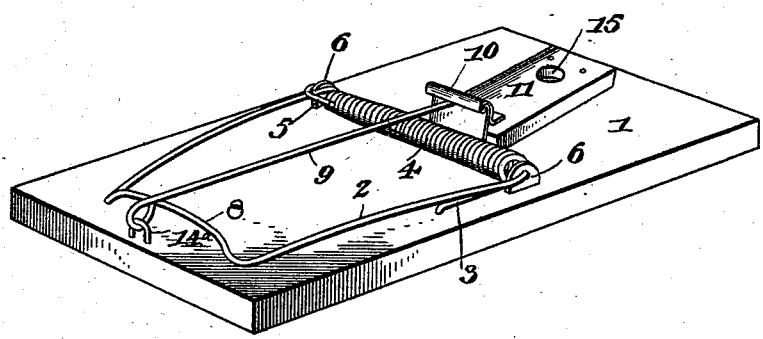
Figure 2:
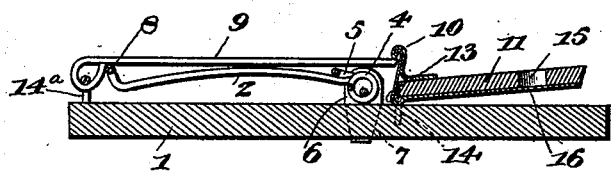
Figure 3:
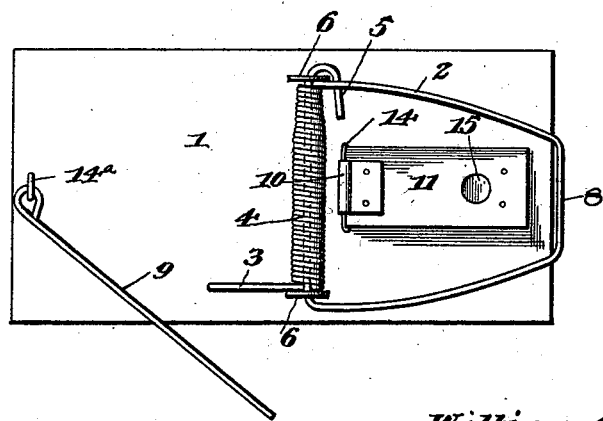

In the drawings: Figure 1 is a perspective view of a trap constructed in accordance with this invention and shown set. Fig. 2 is a longitudinal sectional view of the same. Fig. 3 is a plan view, the trap being sprung.

Like numerals of reference indicate corresponding parts in all the figures of the drawings.

1 designates a base, upon which is mounted a spring-actuated jaw 2, formed integral with a spiral spring and adapted to be forced downward by the same against the front portion of the base and in contact with an animal for catching the same. The resilient wire, of which the spiral spring and the jaw are constructed, is bent to form an arm 3. It is then coiled into the transverse spring 4 and is extended from one end thereof to form the loop or jaw 2, which terminates at the other end of the transverse coil 4. It is then passed through the longitudinal opening of the coil and terminates in an inward extension 5, which is arranged below the jaw, and which serves to support the same. The jaw and the spring are secured hingedly to the base by perforated ears 6, which are provided with shanks 7, passed through the base and bent upward against the lower face of the same, the perforations of the ears receiving the extension 5, and the rear terminal of one side of the jaw. The outer end of the arm 3 is bent downward, and inserted in the base, which is preferably constructed of wood.

The spring is of sufficient strength to force the jaw violently against an animal, and the front end 8 of the jaw which is approximately V-shaped is bent downward at an angle to the body of the jaw beyond the base, to form a grip to prevent the animal caught from being forced outward, and to hold the same securely. The jaw is held backward, when the trap is set, against the action of the transverse spring by a locking-bar 9, which passes over the jaw and which has its rear end loosely connected to the base. The front end of the locking-bar is adapted to engage a catch 10, of a hinged trigger 11, which is centrally arranged at the front of the base. The catch consists of a piece of sheet metal, which is doubled above the trigger and which is bent rearward to form a shoulder, and which extends below the trigger and is bent to form a pintle-eye 13, to receive a pintle 14; and the ends of the sheet metal are extended forward forming securing-plates, which are fastened to the rear end of the trigger. The pintle may consist of a staple, or may have its ends bent to form shanks which are passed through the base. The rear end of the locking-bar is bent to form an eye which is linked into a staple or eye 14$^a$ at the rear end of the base.

The particular construction of the catch forms a very sensitive trap, and the latter may be conveniently set by inverting it and arranging the front end of the locking-bar above the shoulder of the catch, which will automatically engage it. The slightest pressure on the trigger will cause the springing of the trap.

The trigger is preferably constructed of wood, but may be made of any suitable material. It is provided with a bait-opening 15, beneath which is secured a plate 16 which closes the bottom of the opening; and by this arrangement a bait receptacle is provided which necessitates an animal touching the trigger in order to obtain the bait; and in so touching it a downward pressure is necessarily produced, which will cause the trap to be instantly sprung.

It will be seen that the trap is simple and comparatively inexpensive in construction, that it is positive and reliable in operation, and that it is adapted to be placed adjacent to a rat-hole or between boxes or near furniture where mice are liable to run, and that it is readily sprung by an animal in passing over it, even when not attempting to obtain the bait.

Changes in the form, proportion, and the minor details of construction may be resorted to without departing from the principle or sacrificing any of the advantages of this invention.

What I claim is—

1. A trap, comprising a base, a spring-actuated jaw constructed of a single piece of wire coiled to form a transverse spring and extended from one end of the latter and shaped into a loop terminating at the opposite side of the coil and continued to form a transverse portion arranged within the coil, bearings receiving the ends of the transverse portion, a locking-bar, and a trigger for setting the jaw, substantially as described.

2. A trap, comprising a base, a spring-actuated jaw constructed of a single piece of wire coiled to form a transverse spring and extended from one end of the latter and shaped into a loop terminating at the opposite side of the coil and continued to form a transverse portion arranged within the coil, one end of the wire being extended rearwardly to form an arm and the other end being extended transversely, a locking-bar, and a trigger for setting the jaw, substantially as described.

3. A trap, comprising a spring-actuated jaw, a locking-bar, a trigger provided at its rear end with a catch, and an eye constructed of a single piece of sheet metal doubled above the trigger and bent rearward and having its ends secured to the upper and lower faces of the trigger, a pintle arranged in the eye and hinging the trigger to the base, and a locking-bar, substantially as described.

In testimony that I claim the foregoing as my own I have hereto affixed my signature in the presence of two witnesses.

WILLIAM C. HOOKER.

Witnesses:
  K. R. MARKS,
  J. E. COX.